No. 840,363. PATENTED JAN. 1, 1907.
A. S. PATTON.
CROSSCUT SAW HANDLE.
APPLICATION FILED JAN. 22, 1904.
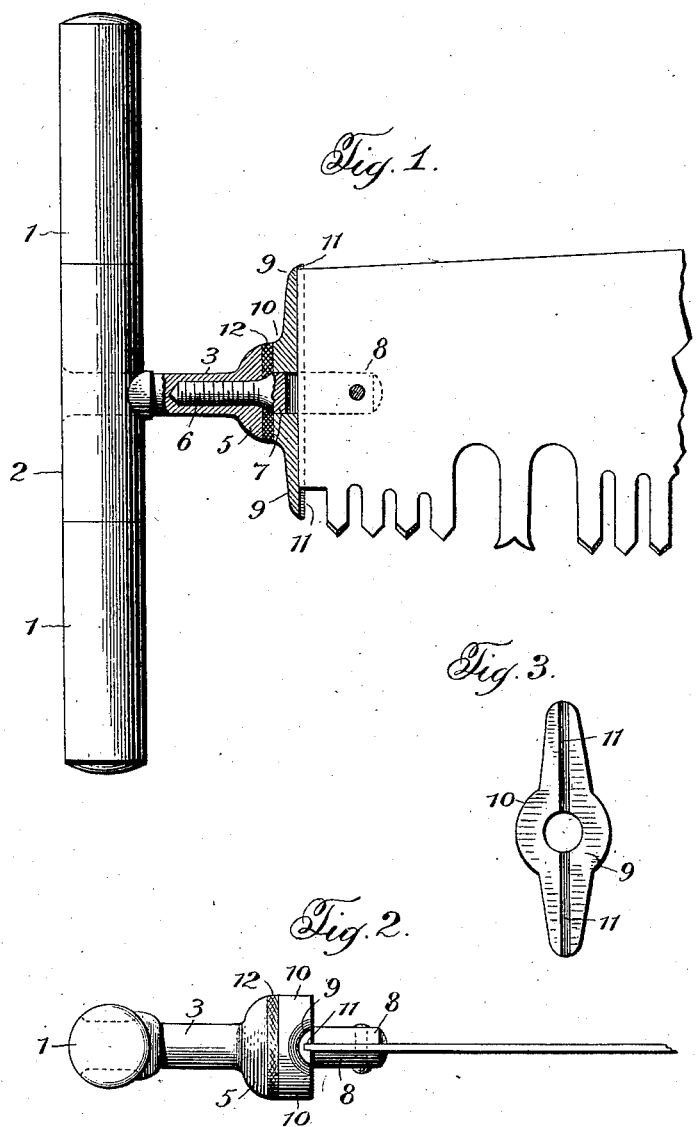

UNITED STATES PATENT OFFICE.

ALFRED S. PATTON, OF FRANCES, WASHINGTON, ASSIGNOR OF TWO-THIRDS TO JOHN H. DRISSLER AND FREEMAN ALBRIGHT, OF SOUTH BEND, WASHINGTON.

CROSSCUT-SAW HANDLE.

No. 840,363.         Specification of Letters Patent.         Patented Jan. 1, 1907.

Application filed January 22, 1904. Serial No. 190,251.

*To all whom it may concern:*

Be it known that I, ALFRED S. PATTON, a citizen of the United States, residing at Frances, in the county of Pacific, in the State of Washington, have made certain new and useful Improvements in Saw-Handle Fastenings, of which the following is a specification.

The invention relates to saw-handle fastenings, and has for its object to provide an improved fastening means for detachably securing a handle to a saw in order that the former can be used with different saws.

A further object is to so arrange the fastening means that while the same is out of the way of the sawyer it can at the same time be conveniently adjusted to firmly connect a handle with a saw.

The invention consists in the construction and arrangement of parts hereinafter described and shown, and particularly pointed out in the claim hereto appended.

In the drawings, Figure 1 is a sectional elevation of a saw-handle fastening embodying the herein-described invention and illustrated in applied position. Fig. 2 is a top plan view thereof. Fig. 3 is a front elevation of the guard-plate.

Like numerals of reference designate corresponding parts in all the figures of the drawings.

1 designates the handle proper, which is embraced midway its ends by a transverse socket 2, having formed integral therewith and at right angles thereto a clamping member or jam-nut comprising a sleeve 3, formed with a collar 5 at its outer extremity. The sleeve 3 is internally screw-threaded to receive the threaded shank 6 of a saw-bolt 7, having the forked end 8, in which is rigidly secured the saw. Slidably mounted on the forked end 8 of the saw-bolt 7 is a guard-plate 9, having its rear face merging into a collar 10 and its front face provided with a groove 11 for the reception of the saw-blade.

The clamping member or jam-nut is adapted to be adjusted longitudinally of the saw-bolt 7 by turning the handle 1 until the collar 5 engages the collar 10 of the guard-plate 9 and tightly clamps the latter to the saw-blade to form a rigid connection between the handle 1 and the saw-blade.

A washer 12, made of leather or similar compressible or elastic material, may be interposed between the clamping member or jam-nut 3 and the guard-plate to form a frictional lock for the parts after they have been adjusted.

I claim—

A fastening for saw-handles, comprising a bolt having a forked end to receive a saw-blade and also having a threaded shank, a handle-socket provided with a sleeve arranged at right angles thereto, said sleeve being internally threaded to receive the threaded shank of said bolt and thereby permit adjustment of said socket upon said bolt, said sleeve having a collar at its free end, a guard-plate loosely mounted upon said bolt and having a groove in one of its faces for the reception of the saw-blade, said guard-plate also having a collar at its face opposite to said grooved face, and a washer of compressible material arranged upon said bolt between the collar of the sleeve and the collar of the guard-plate and forming a frictional lock between said collars when the sleeve is adjusted toward the saw-blade.

A. S. PATTON.

Witnesses:
JOHN OWENS,
CHAS. B. HANDY.